United States Patent
Blyler, Jr. et al.

[11] Patent Number: 5,117,472
[45] Date of Patent: May 26, 1992

[54] OPTICAL COUPLER WITH MODE-MIXING REFRACTIVE MICROPARTICLES

[75] Inventors: Lee L. Blyler, Jr., Basking Ridge; Robert W. Filas, Bridgewater, both of N.J.; Gary J. Grimes, Thornton, Colo.

[73] Assignee: AT&T Bell Laboratories, Murray Hill, N.J.

[21] Appl. No.: 635,907

[22] Filed: Dec. 28, 1990

[51] Int. Cl.⁵ ............................................. G02B 6/26
[52] U.S. Cl. ...................................... 385/28; 385/31; 385/125; 385/141
[58] Field of Search ............... 350/96.10, 96.29, 96.30, 350/96.32, 96.33, 96.34; 385/27, 28, 29, 31, 39, 123, 125, 147, 141–143

[56] References Cited

U.S. PATENT DOCUMENTS

| | | | |
|---|---|---|---|
| 3,756,688 | 9/1973 | Hudson et al. | 350/96 WG |
| 3,874,781 | 4/1975 | Thiel | 350/96 C |
| 4,169,656 | 10/1979 | Hodge | 350/96.15 |
| 4,195,907 | 4/1980 | Zamja et al. | 350/96.32 |
| 4,198,118 | 4/1980 | Porter | 350/96.16 |
| 4,212,512 | 7/1980 | Hodge | 350/96.15 |
| 4,422,719 | 12/1983 | Orcutt | 350/96.30 |
| 4,466,697 | 8/1984 | Daniel | 350/96.30 |
| 4,484,794 | 11/1984 | Witte | 350/96.16 |
| 4,733,929 | 3/1988 | Brown | 350/96.10 X |
| 4,913,508 | 4/1990 | Blyler, Jr. et al. | 350/96.16 |
| 4,974,933 | 12/1990 | Ainslie et al. | 350/96.34 |
| 4,995,686 | 2/1991 | Blonder et al. | 350/96.15 |

FOREIGN PATENT DOCUMENTS 1558404  1/1980  United Kingdom ............. 350/96.32

OTHER PUBLICATIONS

M. Born & E. Wolf, *Principles of Optics*, Pergamon Press, Inc., N.Y. 10523, 1980, pp. 633–647.

Primary Examiner—John D. Lee
Attorney, Agent, or Firm—John C. Moran

[57] ABSTRACT

An optical coupler having an optical core in which a small concentration of refractive microparticles has been added to a suspension material of the optical core. The result is that light from an optical source is bent slightly by the refractive effects of the microparticles and is coupled into the higher order of modes over a relatively short distance within the optical core. These microparticles are closely matched to the index of refraction of the suspension material resulting in smaller deflection angles and fewer reflections. In addition, these microparticles match the specific gravity of the suspension material such that they do not settle out of a suspension while the optical core material is being hardened from a semi-liquid state.

22 Claims, 4 Drawing Sheets

OPTICAL COUPLER WITH MODE-MIXING REFRACTIVE MICROPARTICLES

TECHNICAL FIELD

The present invention relates to the communication of light in an optical system, and in particular, to an optical coupler used in such a system.

BACKGROUND OF THE INVENTION

In many optical local area networks (LANs) and optical backplanes that have a bus-type architecture, an optical repeater receives and combines optical signals from optical transmitters in system nodes, as well as amplifies and retransmits these signals back to optical receivers in the system nodes. The optical repeater utilizes optical couplers as a combiner and as a splitter. The combiner receives optical signals from the optical transmitters via individual optical fibers and combines those optical signals. The splitter transmits a portion of a common optical signal (generated by the optical repeater) to each optical receiver via an individual optical fiber. The optical splitter uses a single optical source to generate an optical signal for transmission on optical fibers connected to the optical receivers.

Optical couplers for performing the functions of optical combiners and splitters are known in the art. One such optical coupler is disclosed in U.S. Pat. No. 4,913,508 of L. L. Blyler, Jr. et al., issued Apr. 3, 1990. When communicating light between a first plurality and a second plurality of optical fibers, this prior art optical coupler depends on the optical core of the optical coupler bending the light sufficiently so that higher order modes of light are obtained. These higher order modes of light then produce a uniform amount of light striking each of the receiving optical fibers. Such prior art optical couplers having reasonable lengths perform adequately for optical sources which produce a rapidly diverging beam of light. For example, as illustrated in the aforementioned U.S. Pat. No. 4,913,508, one such source is a large numerical aperture step index optical fiber.

Although the prior art optical couplers perform adequately for certain optical sources, a problem arises when certain types of optical lasers are used as optical sources in such couplers because certain optical lasers have a narrow divergence angle. This problem can arise even when the laser is connected to the optical coupler via an optical fiber. For a diode laser transmitting into a transparent medium, this angle is typically a 5 degree half angle in one dimension and a 15 degree half angle in the other. The optical beam of such a laser diverges so slowly that the prior art couplers must be made very long to achieve the required uniformity of mode distribution within the optical coupler. Such long prior art couplers are difficult to use because of the physical space required and because of the amount of light energy dissipated within such an optical coupler.

SUMMARY OF THE INVENTION

The aforementioned problem is solved and a technical advance is achieved in the art by an optical coupler having an optical core in which a small concentration of refractive particles has been added to a suspension material of the optical core. The result is that light from an optical source is bent slightly by the refractive effects of the particles and is coupled into the higher order modes over a relatively short distance within the optical core.

Advantageously, in one embodiment, these particles are closely matched to the index of refraction of the suspension material resulting in smaller deflection angles and lower intensity reflections. In addition, these particles match the specific gravity of the suspension material so that they do not settle out of a suspension while the optical core material is being hardened from a semi-liquid state. Also, a suspension material may be used whose refractive index matches the refractive index of commonly used silica fibers, thus reducing reflection at the ends of the fibers.

Other further aspects of the present invention will become apparent during the course of the following description and by reference to the accompanying drawing.

BRIEF DESCRIPTION OF THE DRAWING

Referring now to the drawing.

DETAILED DESCRIPTION

Figure 1:
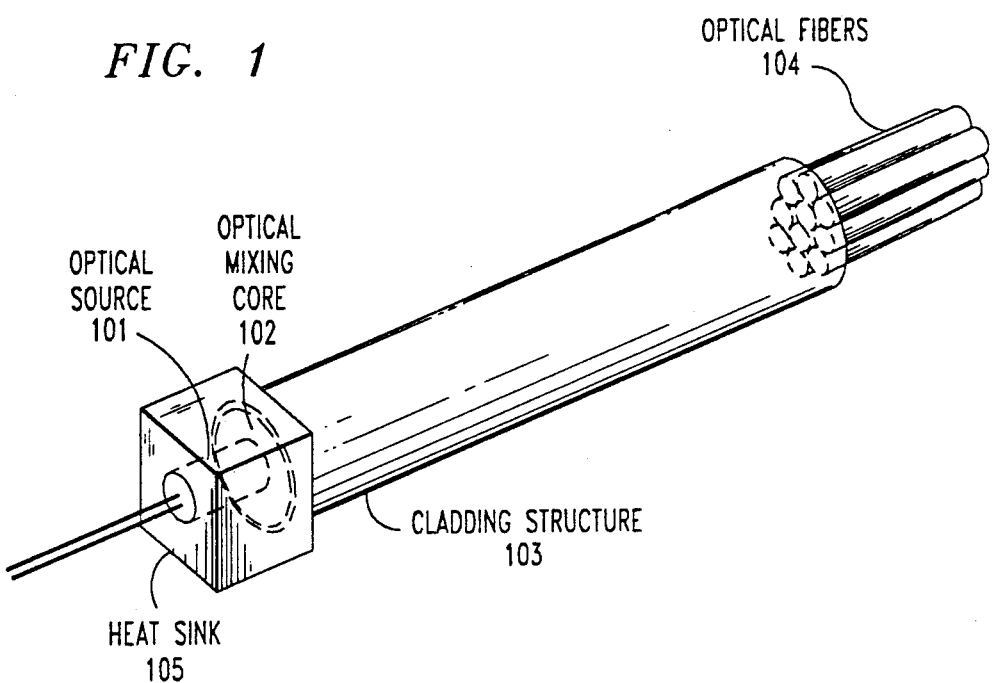
FIG. 1 illustrates an optical coupler in accordance with the invention with an attached optical source.

FIG. 1 illustrates one embodiment of an optical coupler that is utilized as an optical splitter with optical source 101 transmitting light through optical mixing core 102 to optical fibers 104. Optical mixing core 102 fills cladding structure 103 such that optical fibers 102 are embedded in optical mixing core 102. Optical source 101 and heat sink 105 are attached to the optical splitter. In accordance with the invention, a small concentration of refractive particles has been added to the suspension material of optical mixing core 102. These particles have a typical dimension of 10 to 500 microns and will be hereafter be referred to as microparticles. As light is transmitted by optical source 101 into optical mixing core 102 toward optical fibers 104, the light is bent slightly by various microparticles and, as a result, is coupled into higher order modes over the distance between optical source 101 and optical fibers 104. The coupling of the light into higher order modes results in a uniform mode power distribution being applied to optical fibers 104. It is well known in the art that a uniform mode power distribution in a large, high numerical aperture, step index waveguide results in a uniform power distribution across the aperture of the waveguide. In this embodiment, optical source 101 is advantageously an optical laser; however, there could be a plurality of optical sources utilized in place of optical source 101.

Figure 2:
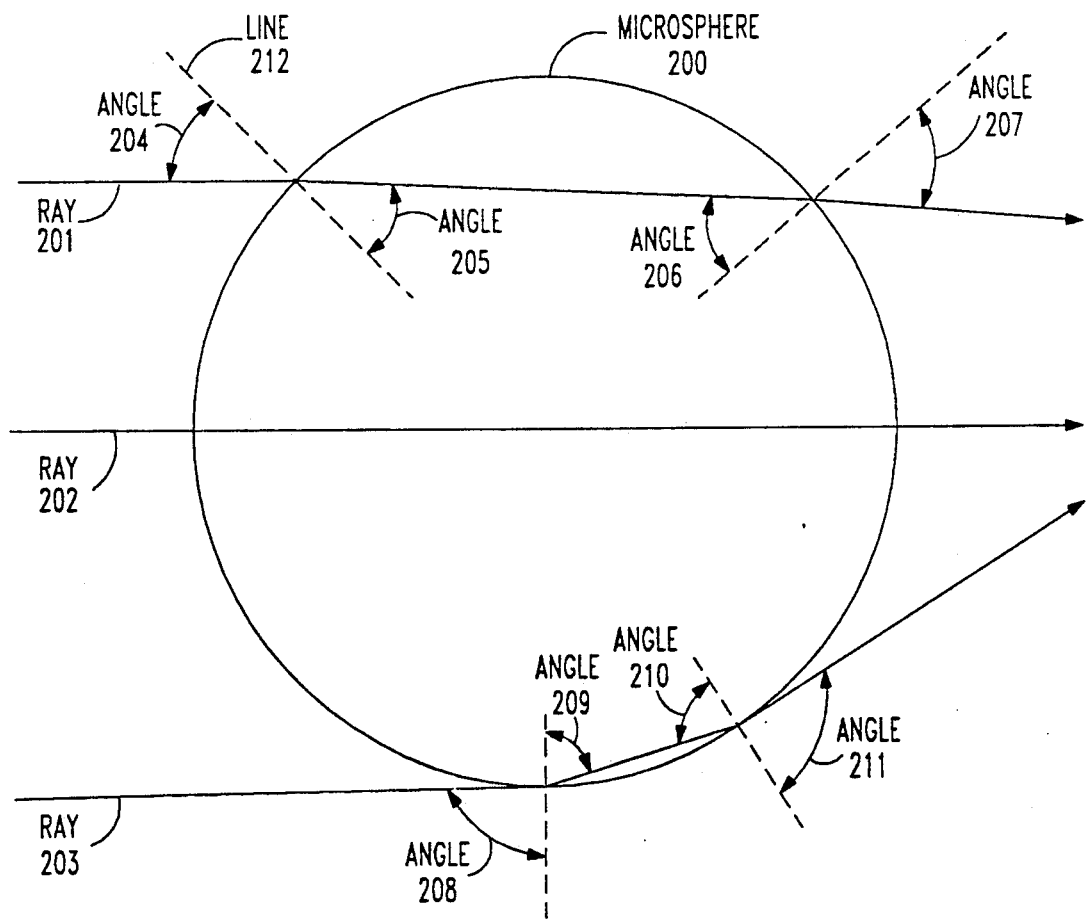
FIG. 2 illustrates the refractive action of a microparticle within the optical coupler.

To understand the manner in which the refractive microparticles cause light to be bent resulting in higher order modes, consider FIG. 2 which illustrates three rays of light striking a single microparticle (illustrated as a sphere) and being refracted. FIG. 2 illustrates only a two-dimensional representation of the effects that an individual microparticle has within optical mixing core 102 of FIG. 1. For discussion purposes, microparticle 200 is assumed to have a refractive index of 1.46 and is suspended in a material having a refractive index of 1.40. All refractive indices referred to herein are measured at the wavelength of the sodium D-line. The dashed lines illustrated in FIG. 2, i.e. line 212, are perpendicular to microparticle 200.

When a ray of light passes from one material to another material, the amount of refraction that occurs is defined by Snell's law of refraction which defines the angle of refraction by using the angle of incidence and the refractive indices of the two materials. Snell's equation is as follows:

$$n_1 \sin \theta_1 = n_2 \sin \theta_2 \quad (1)$$

where $n_1$ is the refractive index of the material that the light ray is leaving; $\theta_1$ is the angle of incidence; $n_2$ is the refractive index of the material the light ray is entering; and $\theta_2$ is the angle of refraction. Applying Snell's law to FIG. 2, ray 202 strikes microparticle 200 perpendicularly to its surface. Consequently, ray 202 is not bent by refraction. Ray 201 enters microparticle 200 with an angle of incidence equal to angle 204, which is 45 degrees. Applying Equation 1, the angle of refraction (angle 205) is 42.6 degrees. Ray 201 leaves microparticle 200 with an angle of incidence (angle 206) equal to angle 205. The angle of refraction (angle 207) upon exiting microparticle 200 is 45 degrees. The total deflection of ray 201 caused by the two refractions (angles 205 and 207) is 4.9 degrees from the original direction of travel of ray 201. When the angle of travel is changed, the propagating mode of the ray is necessarily changed. Since a light ray begins with predominantly lower order modes, the probability of shifting a ray from a lower order mode to a higher order mode is higher than the reverse.

Ray 203 is intended to show a situation where a ray of light strikes a microparticle at such an angle that it is substantially bent. In this example, ray 203 strikes microparticle 200 at an angle of incidence (angle 208) equaling 89 degrees, resulting in an angle of refraction (angle 209) equaling 73.4 degrees. Ray 203 leaves microparticle 200 with an angle of incidence (angle 210) equaling 73.4 degrees. The angle of refraction (angle 211) upon exiting microparticle 200 equals 89 degrees. The total deflection caused by the two refractions is 32 degrees from the original direction of travel of ray 203. With respect to FIG. 2, the probability of a light ray striking a microparticle with a high angle of incidence, e.g. ray 203, is less than the probability of a light ray striking a microparticle with a relatively low angle of incidence, e.g. rays 201 and 202. (The reason for this difference of probabilities is that a microparticle presents less surface area to rays striking at angles such as angle 208.) Thus, most of the rays passing through the coupler will experience relatively small deflections. This is important because if light strikes optical cladding structure 103 of FIG. 1 at an angle greater than the acceptance angle of the optical coupler, the light is lost through that cladding structure.

More specifically, the acceptance angle is given by Equation 2 as follows:

$$\text{acceptance angle} = \sin^{-1} \sqrt{n_1^2 - n_2^2} \quad (2)$$

where $n_1$ is the refractive index of the optical mixing core and $n_2$ is the refractive index of the optical cladding structure. To illustrate further how light is lost through optical cladding, consider FIG. 3. The material of optical cladding 304 is assumed to have a refractive index of 1.33. Because of the small concentrations of microparticles in optical mixing core 303, the effect of these microparticles on the refractive index is ignored; and the refractive index of optical mixing core 303 is thus assumed to be that of the suspension material. This material is assumed to have a refractive index of 1.4. Applying these refractive indices to Equation 2, the acceptance angle for the structure illustrated in FIG. 3 is 26.7 degrees, resulting in angle 306 being 53.4 degrees.

Figure 3:
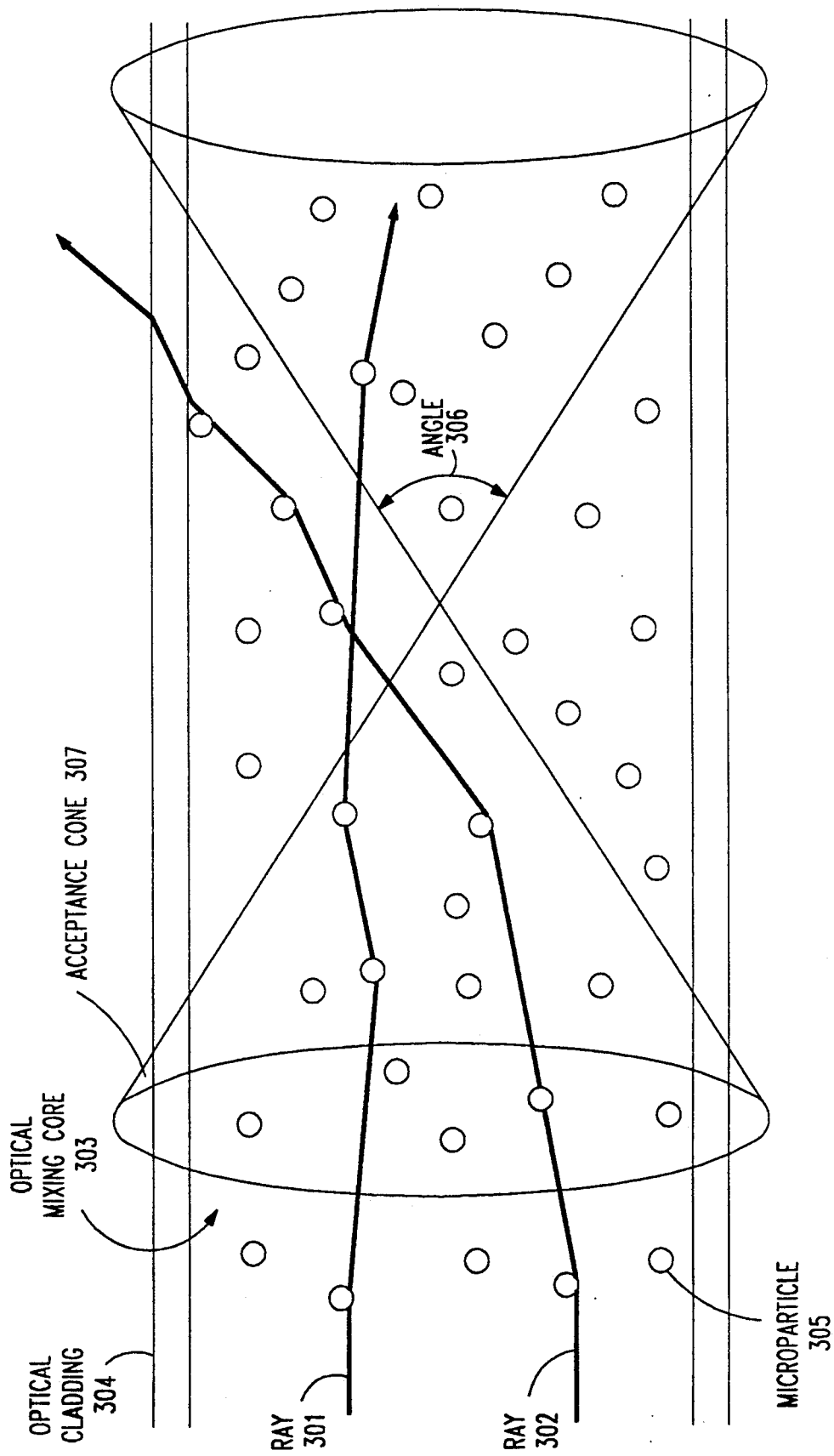
FIG. 3 illustrates the refractive actions of a plurality of microparticles within the optical coupler.

FIG. 3 illustrates an acceptance cone defining the acceptance angle with angle 306 being twice the acceptance angle. Clearly, a ray experiencing a large deflection, such as ray 203 of FIG. 2, exits from FIG. 3 after one encounter with a microparticle since the resulting angle exceeds the acceptance angle of 26.7 degrees. This result occurs unless the ray strikes another microparticle that corrects the deflection angle to be within the acceptance cone. As FIG. 3 illustrates, ray 301 strikes microparticles in such a way as to stay within the acceptance cone as defined by angle 306. Microparticle 305 illustrates one of the microparticles. The majority of the rays entering the optical coupler formed by optical cladding 304 and optical mixing core 303 will be deflected in a manner similar to that of ray 301. However, a minority of the rays will be lost through optical cladding 304 because the sum of their angles of refraction will exceed the acceptance angle. An example of such a ray is illustrated by ray 302. (In FIG. 3, the microparticles are illustrated as being separate from each other, however, they may also be connected together.)

In the following paragraphs, the fabrication of two preferred embodiments of the optical coupler illustrated in FIG. 1 are described. The first of these embodiments utilizes the same materials that have been described with respect to FIGS. 2 and 3; however, the second embodiment includes different materials so as to achieve increased performance. The materials used in the second embodiment are described in the description of the fabrication of the second embodiment.

The first embodiment is fabricated by preparing seven optical fibers (Mitsubishi ESKA EXTRA PMMA having a 1 mm diameter) as described in the aforementioned U.S. Pat. No. 4,913,508, which is hereby incorporated by reference. The optical core material utilizes a suspension material of a cross-linkable silicone resin (Shin-Etsu KE103) with a concentration of microparticles equal to 0.5% by weight. Each microparticle has a maximum dimension of less than 100 microns. The microparticles are each an aggregation of very small particles of a silca material produced by flame hydrolysis of silicon tetrachloride. This material was obtained from Cabot, Inc. which manufactures this material under the trade name Cabosil EH 7. The cladding structure is Teflon ® FEP tubing having an inner diameter of 3 millimeters. Shin-Etsu KE103 has a refractive index of 1.404, the microparticles have a refractive index of 1.46, and Teflon ® FEP has a refractive index of 1.345. Twenty centimeters of the aforementioned tubing is taped with transparent tape to a flat mylar surface during fabrication. The optical fibers (optical fibers 104) are inserted one at a time into the tubing. Utilizing an optical microscope, the ends of the fibers are aligned to within half a fiber's outside diameter and positioned so that their ends are approximately 0.75 centimeters into the tube. After alignment, the fibers are taped to the mylar sheet. The other end of the tube is plugged with a suitable clay. The optical mixing core material is mixed to the previously mentioned concentration, stirred with a magnetic stirrer, and degassed. After degassing, the material is inserted into a 10 cc syringe having an 18 gauge needle. The needle is inserted approximately 0.5 centimeters into the end of the tube opposite the fibers. The optical mixing core material is injected into the tube so that it flows through the fibers, filling the interstices and exiting the tube end. The needle is then slowly removed while maintaining the injection pressure so that the tube is entirely filled without the introduction of air bubbles. The core material is then allowed to harden to a semi-soft state. At this point, the tubing and core materials are cut so that there is approximately 5 centimeters from the end of the fibers to the cut end. Then, light source 101 is abutted against the cut end of the tube, resulting in approximately 5 centimeters being between light source 101 and optical fibers 104. Advantageously, the light source is an optical laser.

In a test of the optical coupler thus constructed, light source 101 was energized, and the light power emanating from each of optical fibers 104 was measured with an optical detector such as Photodyne Model 22 XL. The power output of the optical fibers was within 1.93 db of each other, indicating a uniform distribution of light from light source 101 to all the optical fibers.

In the second embodiment, the optical core material utilizes a suspension material of silicone elastomer with a microparticle concentration of 10% by weight. The microparticles are composed of poly(isobutyl methacrylate). Each microparticle is roughly spherical and has a maximum dimension of less than 105 microns. The suspension material is composed of 0.05% PC 085 in PS 783 mixed with PS 129.8 in a mass ratio of 30.5 (PS 783/PS 129.8). PC 085, PS 783, and PS 129.8 are commercially available from Petrarch Systems, Inc. The microparticles and suspension material have indices of refraction of 1.477 and 1.463, respectively. This similarity of indices of refraction produces smaller deflection angles and fewer reflections which produce less light loss in the optical coupler. This similarity also allows for higher concentrations of microparticles to be used and reduces the length of the optical mixing core. Further, the resulting optical core material closely matches the refractive index of germanium-doped silicon dioxide, which is commonly used for the optical core material of optical fibers. This matching results in reduced reflections between the optical fibers and optical core material. Finally, the microparticles closely match the specific gravity of the suspension material so that they do not settle out during storage or curing. The suspension material has a specific gravity of 1.028 and the microparticles have a specific gravity of 1.045.

An optical coupler is fabricated using the suspension material and microparticles of the second embodiment in the manner as for the first embodiment with the exception that the distance between the end of the optical fibers and other end of the tube is 9 millimeters.

Figure 4:
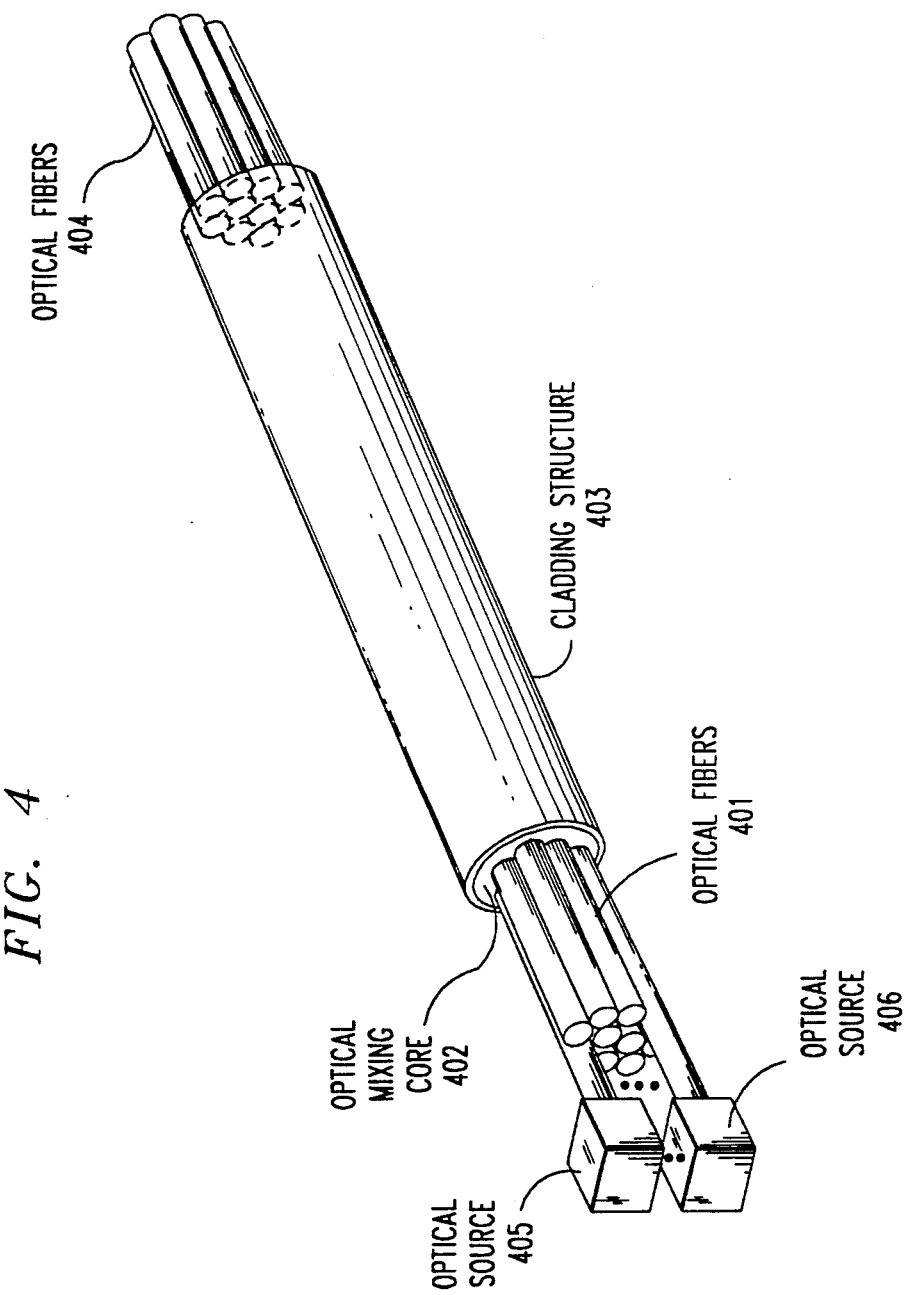
FIG. 4 illustrates an optical coupler with a plurality of optical fibers each having an attached optical source for communicating light to another plurality of optical fibers.

FIG. 4 illustrates another optical coupler in accordance with the invention for communicating light received via optical fibers 401 from optical sources 405 through 406 to optical fibers 404. The optical coupler of FIG. 4 is fabricated in accordance with U.S. Pat. No. 4,913,508 utilizing the suspension materials, refractive microparticles, and spacings between optical sources and receivers as detailed in the two previously described embodiments.

Figure 5:
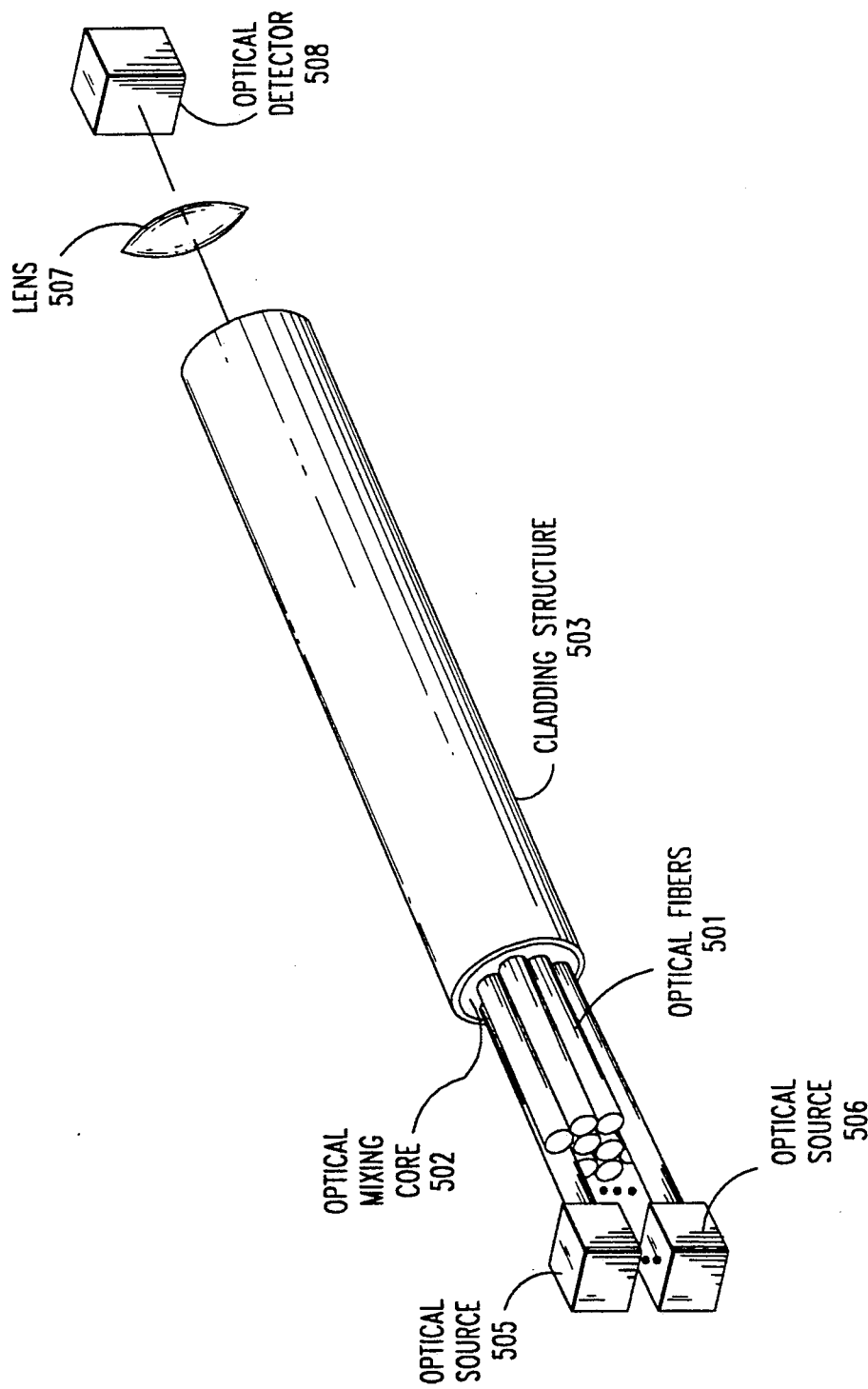
FIG. 5 illustrates an optical coupler with a plurality of optical fibers, each having an attached optical source for communicating light to an optical detector via a lens.

FIG. 5 illustrates another optical coupler in accordance with the invention for communicating light received via optical fibers 501 from optical sources 505 through 506 to optical detector 508 via lens 507. Optical mixing core 502 is fabricated in a manner similar to that for optical mixing core 402 of FIG. 4. For illustration purposes, lens 507 is shown separately from optical mixing core 502; however, lens 507 can be an integral part of core 502. Further, lens 507 can be any type of lens. Lens 507 focuses the light from core 502 onto optical detector 508 after core 502 has uniformly distributed the light from optical fibers 501.

It is to be understood that the above-described embodiments are merely illustrative of the principles of the invention and that other arrangements may be devised by those skilled in the art without departing from the spirit and scope of the invention. In particular, one skilled in the art can devise other materials for the microparticles and suspension material. Further, one skilled in the art can devise other concentrations, sizes of microparticles, and path lengths. The principles of the invention also can be applied to fabricate other optical devices.

We claim:

1. An optical device for the communication of light, comprising:
    an optical cladding structure; and
    an optical core within said optical cladding structure for communicating light from an input of said optical core to an output of said optical core;
    said optical core comprising a suspension material having a plurality of refractive particles for coupling light from lower order propagating modes into higher order propagating modes and said plurality of particles having an index of refraction approximately equal to an index of refraction of said suspension material so as to reduce the amount of light being lost through said cladding structure.

2. The optical device of claim 1 wherein specific gravities of said suspension material and said refractive particles are approximately equal whereby said refractive particles remain suspended in said suspension material for long periods of time.

3. The optical device of claim 1 wherein said suspension material is a cross-linkable silicone resin and said particles are fabricated from silicon dioxide.

4. The optical device of claim 3 wherein each of said particles is an aggregation of smaller particles.

5. The optical device of claim 1 wherein said suspension material is silicone elastomer and said particles are fabricated from poly(isobutyl methacrylate).

6. The optical device of claim 5 wherein each of said particles has a dimension of 10 to 500 microns.

7. An apparatus comprising a plurality of optical signal sources, an optical receiver, and an optical coupler for communicating light between said plurality of optical signal sources and said optical receiver, said optical coupler comprising:

an optical cladding structure; and an optical core within said optical cladding structure for communicating light to said optical receiver from said plurality of optical signal sources;

said optical core comprising a suspension material having a plurality of refractive particles for coupling light from lower order propagating modes into higher order propagating modes and said plurality of particles having an index of refraction approximately equal to an index of refraction of said suspension material so as to reduce the amount of light being lost through said cladding structure.

8. The apparatus of claim 7 wherein said optical signal sources are optical fibers.

9. The apparatus of claim 7 wherein said optical signal sources are optical lasers.

10. The apparatus of claim 9 wherein specific gravities of said suspension material and said refractive particles are approximately equal whereby said refractive particles remain suspended in said suspension material for long periods of time.

11. The apparatus of claim 9 wherein said suspension material is a cross-linkable silicone resin and said particles are fabricated from silicon dioxide.

12. The apparatus of claim 11 wherein each of said particles is an aggregation of smaller particles.

13. The apparatus of claim 9 wherein said suspension material is silicone elastomer and said particles are fabricated from poly(isobutyl methacrylate).

14. The apparatus of claim 13 wherein each of said particles has a dimension of 10 to 500 microns.

15. The apparatus of claim 7 wherein said optical receiver comprises an optical detector and a lens for focusing said light onto said optical detector.

16. The apparatus of claim 7 wherein said optical receiver comprises a plurality of optical fibers.

17. A method for fabricating an optical coupler for optically coupling light between an optical signal source and an optical receiver in a cavity formed by an optical cladding structure, comprising the steps of:

attaching said optical receiver and said optical signal source each to a different end of said optical cladding structure; and injecting into said optical cladding structure a medium comprising a suspension material and refractive particles to form an optical core for coupling light from lower order propagating modes into higher order propagating modes whereby an index of refraction of said refractive particles is approximately equal to an index of refraction of said suspension material so as to reduce the amount of light lost through said cladding structure.

18. The method of claim 17 wherein said optical receiver is a plurality of optical fibers.

19. The method of claim 17 wherein said optical signal source is a plurality of optical fibers.

20. The method of claim 17 wherein said optical signal source is an optical laser.

21. The method of claim 20 wherein specific gravities of said suspension material and said refractive particles are approximately equal whereby said refractive particles remain suspended approximately uniformly in said suspension material for long periods of time.

22. The method of claim 17 wherein said optical receiver comprises an optical detector and a lens for focusing said light onto said optical detector.

* * * * *